US009980127B2

(12) United States Patent
Lee

(10) Patent No.: US 9,980,127 B2
(45) Date of Patent: May 22, 2018

(54) METHOD AND APPARATUS FOR PERFORMING PAIRING PROCESS IN WIRELESS COMMUNICATION SYSTEM

(71) Applicant: Samsung Electronics Co., Ltd., Suwon-si, Gyeonggi-do (KR)

(72) Inventor: Dong-Ik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 138 days.

(21) Appl. No.: 14/874,949

(22) Filed: Oct. 5, 2015

(65) Prior Publication Data
US 2016/0100310 A1 Apr. 7, 2016

(30) Foreign Application Priority Data

Oct. 7, 2014 (KR) .................. 10-2014-0134907

(51) Int. Cl.
*H04L 29/06* (2006.01)
*H04W 12/04* (2009.01)
*H04W 4/00* (2018.01)
*H04W 76/02* (2009.01)
*H04W 52/04* (2009.01)
*H04W 12/06* (2009.01)

(52) U.S. Cl.
CPC ......... *H04W 12/04* (2013.01); *H04L 63/0853* (2013.01); *H04L 63/0884* (2013.01); *H04W 4/005* (2013.01); *H04W 12/06* (2013.01); *H04W 52/04* (2013.01); *H04W 76/023* (2013.01); *H04L 63/107* (2013.01)

(58) Field of Classification Search
CPC ............ H04L 63/06; H04L 63/08; H04L 9/08
See application file for complete search history.

(56) References Cited

U.S. PATENT DOCUMENTS

| 5,396,648 | A | 3/1995 | Patsiokas et al. |
| 6,188,715 | B1 | 2/2001 | Partyka |
| 6,483,884 | B1 | 11/2002 | Shen et al. |
| 8,467,770 | B1 | 6/2013 | Ben Ayed |

(Continued)

OTHER PUBLICATIONS

Suomalainen Jani, "Smartphone Assisted Security Pairings for the Internet of Things", 2014 4th International Conference on Wireless Communications, Vehicular Technology, Information Theory and Aerospace & Electronic Systems (Vitae), XP032665764, pp. 1-5, May 11, 2014.

*Primary Examiner* — Izunna Okeke
(74) *Attorney, Agent, or Firm* — Jefferson IP Law, LLP

(57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart homes, smart buildings, smart cities, smart cars, connected cars, health care, digital education, smart retail, security and safety services. A method for performing a pairing process in a wireless device in a wireless communication system is provided. The method includes transmitting a signal including an encryption key to a terminal, receiving an authentication success message which is encrypted based on the encryption key from the terminal, and performing the pairing process with a coordinator based on the encryption key.

30 Claims, 9 Drawing Sheets

(56) References Cited

U.S. PATENT DOCUMENTS

| | | |
|---|---|---|
| 2001/0004375 A1 | 6/2001 | Partyka |
| 2002/0045424 A1 | 4/2002 | Lee |
| 2005/0171720 A1 | 8/2005 | Olson et al. |
| 2006/0179311 A1* | 8/2006 | McCorkle ............... G01S 7/023 713/168 |
| 2007/0019597 A1 | 1/2007 | Yun et al. |
| 2007/0123215 A1 | 5/2007 | Wang et al. |
| 2007/0140202 A1 | 6/2007 | Calhoun et al. |
| 2008/0117879 A1 | 5/2008 | Wu et al. |
| 2009/0010222 A1 | 1/2009 | Jechoux |
| 2009/0213811 A1 | 8/2009 | Wang et al. |
| 2010/0054179 A1 | 3/2010 | Meyer |
| 2010/0177714 A1 | 7/2010 | Hanaoka et al. |
| 2010/0191593 A1 | 7/2010 | Wang et al. |
| 2010/0235657 A1 | 9/2010 | Cho |
| 2011/0122769 A1 | 5/2011 | Zhang |
| 2011/0148573 A1 | 6/2011 | Ghabra et al. |
| 2011/0173073 A1 | 7/2011 | Wang et al. |
| 2011/0296178 A1 | 12/2011 | Lee et al. |
| 2011/0305337 A1 | 12/2011 | Devol et al. |
| 2012/0287910 A1 | 11/2012 | Wang et al. |
| 2014/0020081 A1 | 1/2014 | Zhang et al. |

\* cited by examiner

METHOD AND APPARATUS FOR PERFORMING PAIRING PROCESS IN WIRELESS COMMUNICATION SYSTEM

CROSS-REFERENCE TO RELATED APPLICATION(S)

This application claims the benefit under 35 U.S.C. § 119(a) of a Korean patent application filed on Oct. 7, 2014 in the Korean Intellectual Property Office and assigned Serial number 10-2014-0134907, the entire disclosure of which is hereby incorporated by reference.

TECHNICAL FIELD

The present disclosure relates to a method and apparatus for performing a pairing process in a wireless communication system.

BACKGROUND

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "detecting technology", "wired/wireless communication and network infrastructure", "service interface technology", and "security technology" have been demanded for IoT implementation, a sensor network, a machine-to-machine (M2M) communication, machine type communication (MTC), and the like, have been recently researched.

Such an IoT environment may provide intelligent Internet technology services that create a new value to human life by collecting and analyzing data generated among connected things. IoT may be applied to a variety of fields including smart homes, smart buildings, smart cities, smart cars or connected cars, smart grids, health care, smart appliances, advanced medical services, and the like, through convergence and combination between existing information technology (IT) and various industrial applications.

Recently, an IoT which denotes an intelligent technology and service in which all things are connected based on an internet thereby information among humans and things, and among things are communicated has been widely used. A wireless device which is based on the IoT is generally connected to an open network.

However, a network pairing scheme and an encryption/authentication scheme under an open network environment have not been proposed up to now. Accordingly, security issues may occur in use of the wireless device.

Meanwhile, an authentication key and an encryption key of a wireless device which does not include a display unit are preset in the wireless device. This is why it is difficult to confirm that the authentication key and the encryption key are correctly input if the display unit is not included in the wireless device. As a result, difficulties for device authentication may occur. Accordingly, a preset authentication key and encryption key are used for an authentication process of the wireless device by considering an issue of inputting a key and compatibility among devices which perform authentication.

However, it is difficult to update the preset authentication key and encryption key, and an issue may occur in security of the wireless device if the preset authentication key and encryption key are exposed. Further, the wireless device has a limitation that the wireless device may communicate with only a device which may be authenticated based on the preset authentication key and encryption key.

Therefore, a need exists for a method and an apparatus for performing a pairing process in a wireless communication system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for performing a pairing process in a wireless communication system.

Another aspect of the present disclosure is to provide a method and an apparatus for performing a pairing process thereby performing authentication for a wireless device using a terminal including a display unit.

Another aspect of the present disclosure is to provide a method and an apparatus for performing a pairing process for a wireless device which is authenticated through a terminal.

Another aspect of the present disclosure is to provide a method and an apparatus for performing a pairing process thereby decreasing power consumption of a wireless device due to the pairing process.

Another aspect of the present disclosure is to provide a method and an apparatus for performing a pairing process thereby it is possible to use a unified pairing scheme for wireless devices of which connection schemes are different.

In accordance with an aspect of the present disclosure, a method for performing a pairing process in a wireless device in a wireless communication system is provided. The method includes transmitting a signal including an encryption key to a terminal, receiving an authentication success message which is encrypted based on the encryption key from the terminal, and performing the pairing process with a coordinator based on the encryption key, wherein the authentication success message is received if an authentication for the wireless device is successful based on a received signal strength of the signal including the encryption key which is measured at the terminal, and wherein the encryption key is transmitted from the terminal to the coordinator if the authentication for the wireless device is successful.

In accordance with another aspect of the present disclosure, a method for performing a pairing process in a coordinator in a wireless communication system is provided. The method includes transmitting a message indicating that a terminal which is adjacent to the coordinator is authorized to perform authentication for a wireless device to the terminal, transmitting a message which requests authentication for the wireless device to the terminal upon receiving a pairing request message from the wireless device, and performing the pairing process with the wireless device using a first encryption key upon receiving an authentication success message and the first encryption key from the terminal.

In accordance with another aspect of the present disclosure, a method for performing authentication for a wireless device in a terminal in a wireless communication system is provided. The method includes receiving a message indicating that the terminal is authorized to perform authentication for the wireless device from a coordinator for a network access of the wireless device, receiving a signal including a first encryption key from the terminal upon receiving a message which requests the authentication for the wireless device from the coordinator, transmitting the first encryption key and an authentication success message indicating that the authentication for the wireless device is successful to the coordinator if the authentication for the wireless device is successful based on a received signal strength of the signal including the first encryption key, and transmitting the authentication success message which is encrypted based on the first encryption key to the terminal.

In accordance with another aspect of the present disclosure, a wireless device in a wireless communication system is provided. The wireless device includes a transmitter configured to transmit a signal including an encryption key to a terminal, a receiver configured to receive an authentication success message which is encrypted based on the encryption key from the terminal, and a controller configured to perform a pairing process with a coordinator based on the encryption key, wherein the authentication success message is received if an authentication for the wireless device is successful based on a received signal strength of the signal including the encryption key which is measured at the terminal, and wherein the encryption key is transmitted from the terminal to the coordinator if the authentication for the wireless device is successful.

In accordance with another aspect of the present disclosure, a coordinator in a wireless communication system is provided. The coordinator includes a transceiver configured to transmit a message indicating that a terminal which is adjacent to the coordinator is authorized to perform authentication for a wireless device to the terminal, and transmit a message which requests authentication for the wireless device to the terminal upon receiving a pairing request message from the wireless device, and a controller configured to perform a pairing process with the wireless device using a first encryption key if an authentication success message and the first encryption key are received from the terminal.

In accordance with another aspect of the present disclosure, a terminal in a wireless communication system is provided. The terminal includes a receiver configured to receive a message indicating that the terminal is authorized to perform authentication for the wireless device from a coordinator for a network access of the wireless device, and receive a signal including a first encryption key from the terminal upon receiving a message which requests the authentication for the wireless device from the coordinator, and a transmitter configured to transmit the first encryption key and an authentication success message indicating that the authentication for the wireless device is successful to the coordinator if the authentication for the wireless device is successful based on a received signal strength of the signal including the first encryption key, and transmit the authentication success message which is encrypted based on the first encryption key to the terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
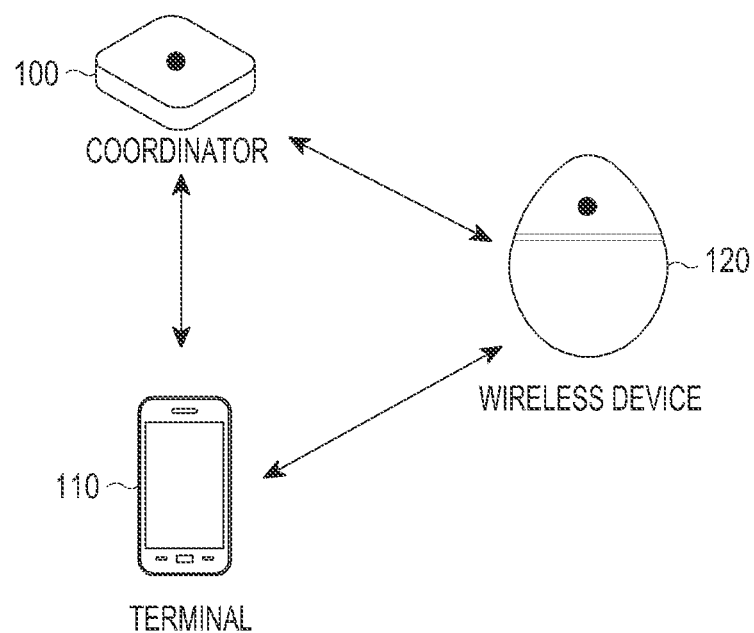
FIG. 1 schematically illustrates a structure of a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although ordinal numbers, such as "first," "second," and the like, will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, a wearable device (e.g., a head-mounted device (HMD), electronic clothes, electronic braces, an electronic necklace, an electronic appcessory, an electronic tattoo, or a smart watch), and the like.

According to various embodiments of the present disclosure, an electronic device may be a smart home appliance with communication functionality. A smart home appliance may be, for example, a television (TV), a digital video disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and the like.

According to various embodiments of the present disclosure, an electronic device may be a medical device (e.g., a magnetic resonance angiography (MRA) device, a magnetic resonance imaging (MRI) device, a computed tomography (CT) device, an imaging device, an ultrasonic device, and the like), a navigation device, a global positioning system (GPS) receiver, an event data recorder (EDR), a flight data recorder (FDR), an automotive information device, a naval electronic device (e.g., a naval navigation device, a gyroscope, a compass, and the like), an avionic electronic device, a security device, an industrial or consumer robot, and the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

An embodiment of the present disclosure provides a method and an apparatus for encoding/decoding data in a wireless communication system supporting a non-binary channel code.

An embodiment of the present disclosure provides a method and an apparatus for encoding/decoding data thereby supporting various modulation schemes in a wireless communication system supporting a non-binary channel code.

An embodiment of the present disclosure provides a method and an apparatus for encoding/decoding data thereby generating a modulation symbol based on a Galois field element value of a non-binary channel code and a modulation order in a wireless communication system supporting a non-binary channel code.

An embodiment of the present disclosure provides a method and an apparatus for encoding/decoding data thereby supporting adaptive modulation and encoding using one non-binary channel code in a wireless communication system supporting a non-binary channel code.

An embodiment of the present disclosure provides a method and an apparatus for mapping a code symbol on a modulation symbol thereby minimizing the number of modulation symbols generated from a plurality of code symbols in a wireless communication system supporting a non-binary channel code.

An embodiment of the present disclosure provides a method and an apparatus for encoding/decoding data thereby providing a signal constellation for bits included in a modulation symbol generated from a plurality of code symbols in a wireless communication system supporting a non-binary channel code.

An embodiment of the present disclosure provides a method and an apparatus for encoding/decoding data thereby demodulating a received symbol with a low complexity in a signal receiving apparatus in a wireless communication system supporting a non-binary channel code.

An embodiment of the present disclosure provides a method and an apparatus for determining a probability value for a received symbol which corresponds to a modulation symbol generated from a plurality of code symbols in a wireless communication system supporting a non-binary channel code.

A method and an apparatus proposed in an embodiment of the present disclosure may be applied to various communication systems, such as a digital video broadcasting system, such as a mobile broadcasting service, such as a digital multimedia broadcasting (DMB) service, a digital video broadcasting-handheld (DVP-H) service, an advanced TV systems committee-mobile/handheld (ATSC-M/H) service, and the like, and an internet protocol TV (IPTV) service, a MPEG media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rd generation project partnership 2 (3GPP2), a wideband code division multiple access (WCDMA) mobile communication system proposed in the 3GPP2, a CDMA mobile communication system proposed in the 3GPP2, an institute of electrical and electronics engineers (IEEE) mobile communication system, a mobile IP (Mobile IP) system, and the like According to various embodiments of the present disclosure, for example, a terminal may be an electronic device including a display unit.

Sensor connectivity schemes which may be used in a wireless sensor network (WSN), such as a zigbee scheme, a Z-wave scheme, a Bluetooth (BT) scheme, and the like, use different pairing schemes and encryption key sharing schemes.

In a case that the zigbee scheme is used, a wireless device and a coordinator as an apparatus for a network access, such as a gateway, a sensor-hub, and the like, use a pairing scheme which is based on button input and a preset encryption key. In an environment in which the zigbee scheme is used, the preset encryption key is fixedly used, so a wireless device which the zigbee scheme is closed, and it is difficult that the wireless device interworks with other device.

In a case that the Z-wave scheme is used, the wireless device and the coordinator use a pairing scheme which is based on low power-signal transmission/reception, and an authentication which is based on whether the wireless device is located within a preset distance from the coordinator. Here, an encryption key is shared between the wireless device and the coordinator while the pairing scheme is used. However, in an environment that the Z-wave scheme is used, if remaining battery charge is less than preset threshold battery charge, it is difficult that the paring scheme is used even though the wireless device is located within the preset distance from the coordinator.

In a case that the BT scheme is used, a paring scheme which is based on transmission/reception for a request message and an accept message and an authentication scheme in which request confirmation is performed are used between wireless devices. Further, an encryption key is used between the wireless devices while the pairing scheme is used. However, in an environment that the BT scheme is used, the paring scheme is performed in a manner of being displayed on a display unit, so it is difficult that the paring scheme is performed if a display unit is not included in each of the wireless devices.

As described above, a paring scheme, an authentication scheme, an encryption key sharing scheme, and the like, are different according to which sensor connectivity scheme is used. As a result, various issues may occur.

Accordingly, an embodiment of the present disclosure proposes a method and an apparatus for performing a pairing process thereby a paring scheme, an authentication scheme, and an encryption key sharing scheme which may be commonly applied to various sensor connectivity schemes are used, and an authentication process is performed in a wireless device which does not include a display unit.

Further, an embodiment of the present disclosure proposes a method and an apparatus for performing a pairing process thereby an open authentication scheme and an open encryption scheme are used for a communication with other new device, and power consumption due to the paring process is decreased.

A structure of a wireless communication system according to an embodiment of the present disclosure will described with reference to FIG. 1.

FIG. 1 schematically illustrates a structure of a wireless communication system according to an embodiment of the present disclosure.

Referring to FIG. 1, the wireless communication system includes a coordinator 100, a terminal 110, and a wireless device 120.

Upon detecting that the wireless device 120 is authenticated through the terminal 110, the coordinator 100 performs a pairing process with the wireless device 120 thereby the wireless device 120 is connected to a network. For example, the network may include a WSN, and the like.

The terminal 110 denotes a device including a display unit, such as a mobile communication terminal, a notebook computer, and the like. The terminal 110 performs a paring process with the coordinator 100, and performs a function of an agent which performs an authentication process and a pairing process for the wireless device 120.

The wireless device 120 denotes a device which accesses a network through the coordinator 100 to perform a communication. For example, if the network is a WSN, the wireless device 120 may be a sensor device. The wireless device 120 performs a pairing process with the coordinator 100 through the terminal 110.

A method and an apparatus for paring the coordinator 100 and the wireless device 120 through the terminal 110 in the wireless communication system will be described below.

A process in which a terminal is registered in a coordinator in a wireless communication system according to an embodiment of the present disclosure will described with reference to FIG. 2.

Figure 2:
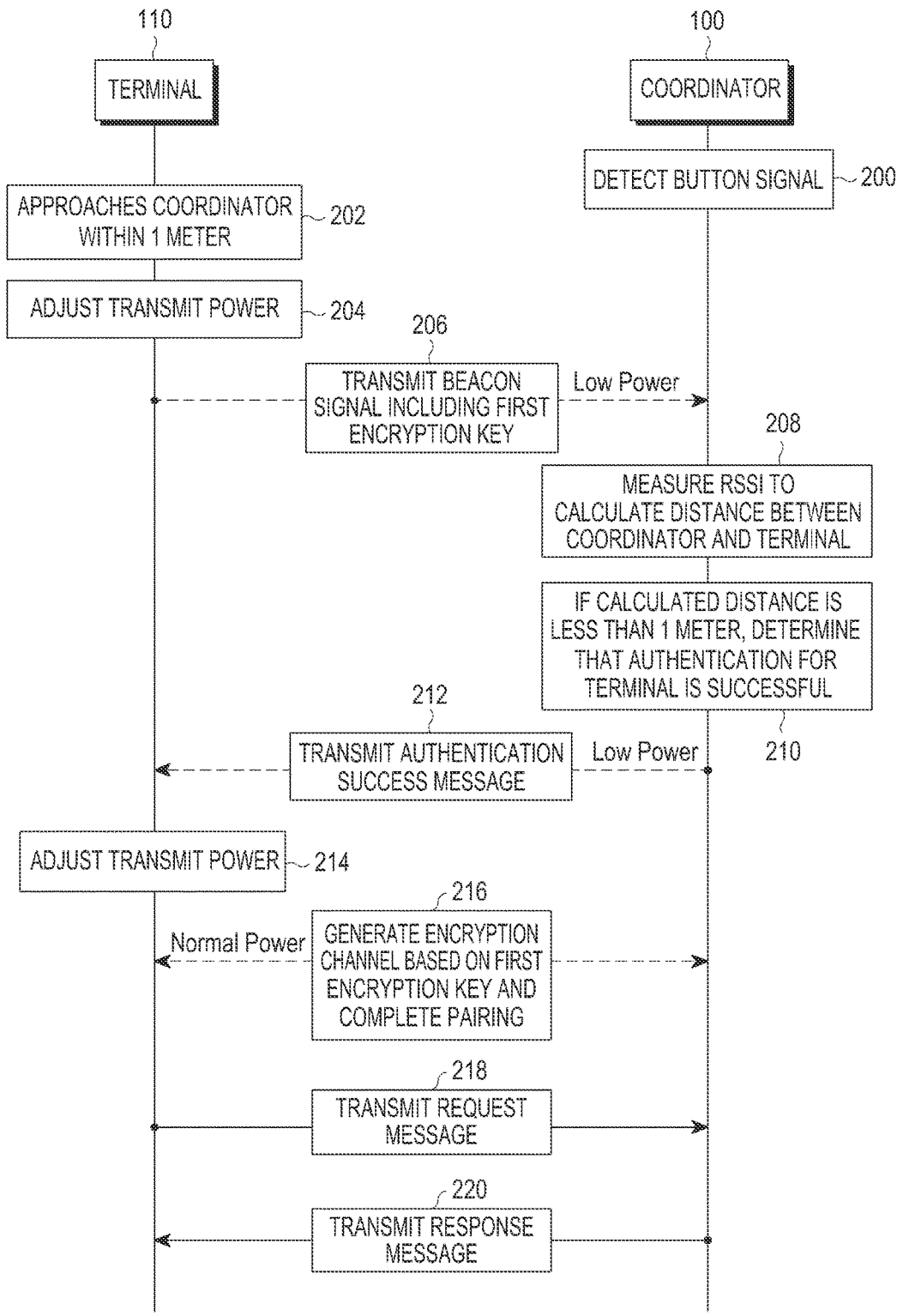
FIG. 2 is a flow diagram illustrating a process in which a terminal is registered in a coordinator in a wireless communication system according to an embodiment of the present disclosure.

FIG. 2 is a flow diagram illustrating a process in which a terminal is registered in a coordinator in a wireless communication system according to an embodiment of the present disclosure.

Referring to FIG. 2, the wireless communication system includes the coordinator 100 and the terminal 110.

Firstly, a button signal which corresponds to a preset button for starting a pairing process included in the coordinator 100 may be detected at operation 200. The button may be one of a physical button included in an outside of the coordinator 100, a soft key which is displayed on a display unit of the coordinator 100, and the like.

Upon detecting the button signal of the coordinator 100, the terminal 110 approaches adjacent location which is within a preset distance from location at which the coordinator 100 is located at operation 202. In FIG. 2, it will be assumed that the preset distance is 1 meter. However, the preset distance may be changed.

If the terminal 110 is within 1 m from the coordinator 100, the terminal 110 adjusts transmit power of the terminal 110 thereby the transmit power is less than preset power at operation 204. The terminal 110 transmits a beacon signal including a first encryption key using the adjusted transmit power at operation 206. Unlike a general beacon signal, the beacon signal is a beacon signal which may be received within the preset distance, and used for transferring the first encryption key. For example, the first encryption key may be a symmetric key which is used in a channel for a communication between the terminal 110 and the coordinator 100, and the like.

Upon receiving the beacon signal, the coordinator 100 measures received signal strength of the received beacon signal and calculates a distance between the coordinator 100 and the terminal 110 based on the received signal strength at operation 208. Here, the received signal strength may be expressed using various parameters, and the various parameters includes a received signal strength indicator (RSSI), received signal code power (RSCP), reference signal received power (RSRP), reference signal received quality (RSRQ), a carrier-to-interference noise ratio (CINR), a signal-to-noise ratio (SNR), a block error rate (BLER), and the like. In an embodiment of the present disclosure, it will be assumed that the received signal strength is an RSSI.

For example, a distance between the coordinator 100 and the terminal 110 may be calculated using Equation 1.

$$\text{propagation loss}=20\times\log 10(4\pi d/\lambda) \text{ dBm}$$

$$=<A\times\log 10(d) \qquad \text{Equation 1}$$

In Equation 1, d denotes a distance between the coordinator 100 and the terminal 110, and A denotes a constant which is determined according to a wireless communication environment and a used frequency band.

Meanwhile, path loss L and the distance between the coordinator 100 and the terminal 110 d may be determined as expressed in Equation 2 and Equation 3, respectively.

$$L=A\times\log_{10}(d)+B \text{ dBm}+C \text{ dBm} \qquad \text{Equation 2}$$

In Equation 2, C denotes the RSSI.

$$d=(\lambda/4\pi)^{(10L/20)}=c/(4\pi f)\times 10^{(L/20)} \qquad \text{Equation 3}$$

Upon detecting that the distance between the coordinator 100 and the terminal 110 is less than 1 meter, the coordinator 100 determines that authentication for the terminal 110 is successful at operation 210. The coordinator 100 transmits an authentication success message indication that the authentication for the terminal 110 is successful to the terminal 110 at operation 212. At this time, the coordinator 100 transmits the authentication success message to the terminal 110 using transmit power which is less than preset transmit power.

Upon receiving the authentication success message, the terminal 110 changes transmit power of the terminal 110 to previous transmit power at operation 214. For example, the terminal 110 adjusts transmit power thereby the transmit power of the terminal 110 is transmit power which is used on performing a general communication. The terminal 110 generates an encryption channel with the coordinator 100 based on the first encryption key, and completes a pairing operation with the coordinator 100 at operation 216.

After the pairing operation is completed, the terminal 110 transmits, to the coordinator 100, a request message for requesting the terminal 110 to perform a function of a pairing agent which performs a pairing operation with the coordinator 100 instead of a wireless device 120 (not shown in FIG. 2) at operation 218. The coordinator 100 transmits a response message which authorizes the terminal 110 to perform the function of the pairing agent in response to the request message at operation 220.

Although FIG. 2 illustrates a process in which a terminal is registered in a coordinator in a wireless communication system according to an embodiment of the present disclosure, various changes could be made to FIG. 2. For example, although shown as a series of operations, various operations in FIG. 2 could overlap, occur in parallel, occur in a different order, or occur multiple times.

A process in which a terminal is registered in a coordinator in a wireless communication system according to an embodiment of the present disclosure has been described with reference to FIG. 2, and a process of performing a pairing process between a coordinator and a wireless device through a terminal in a wireless communication system according to an embodiment of the present disclosure will described with reference to FIG. 3.

Figure 3:
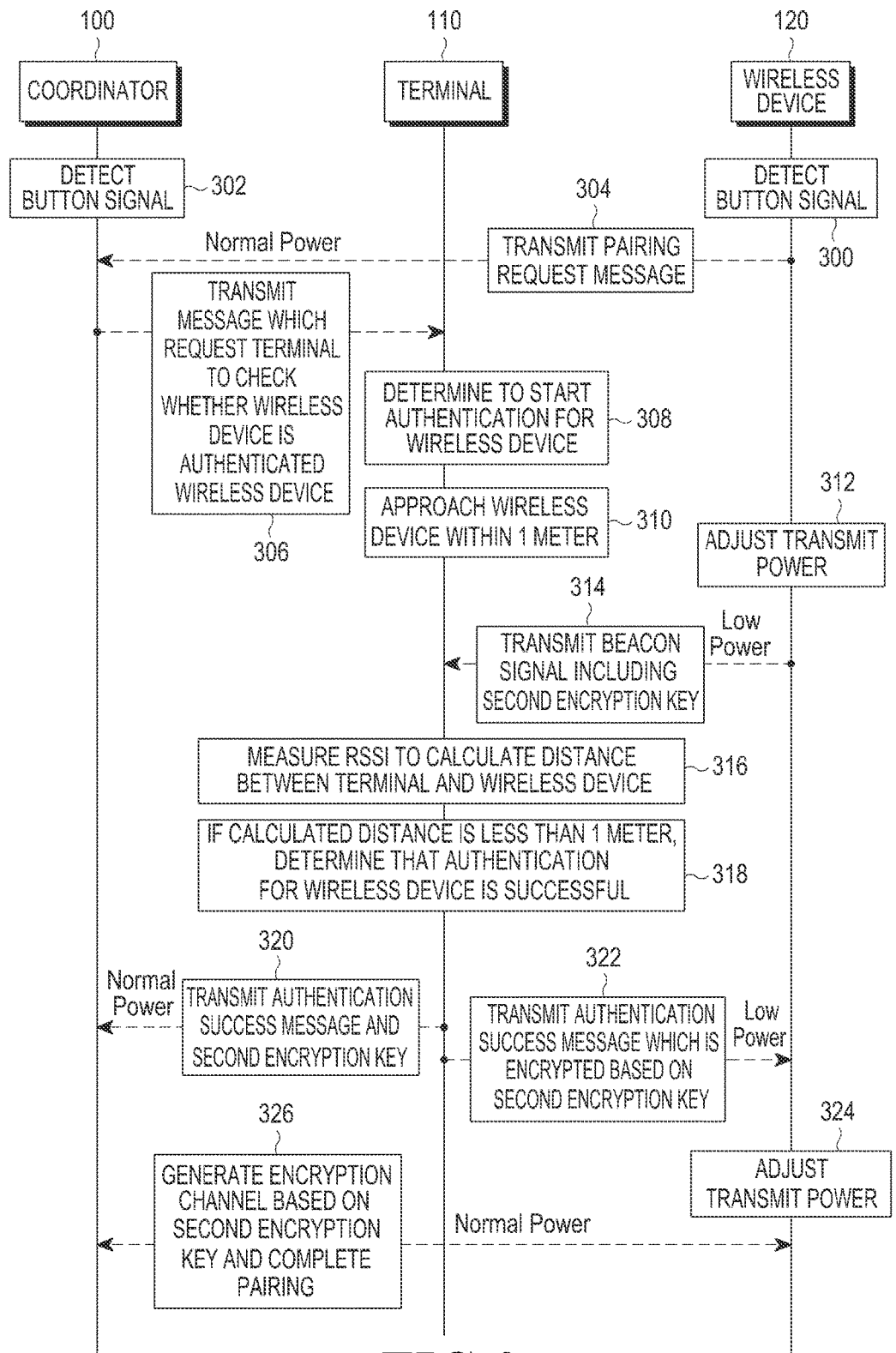
FIG. 3 is a flow diagram illustrating a process of performing a pairing process between a coordinator and a wireless device through a terminal in a wireless communication system according to an embodiment of the present disclosure.

FIG. 3 is a flow diagram illustrating a process of performing a pairing process between a coordinator and a wireless device through a terminal in a wireless communication system according to an embodiment of the present disclosure.

Referring to FIG. 3, it will be assumed that a process of performing a pairing process between a coordinator and a wireless device in FIG. 3 is a process of performing a pairing process between the coordinator 100 and the wireless device 120 through the terminal 110 which performs a pairing agent function.

The wireless communication system includes the coordinator 100, the terminal 110, and the wireless device 120.

Firstly, a button signal which corresponds to a preset button for starting a pairing process included in the wireless device 120 may be detected at operation 300. The button may be one of a physical button included in an outside of the wireless device 120, and the like.

A button signal which corresponds to a preset button for starting a pairing process included in the coordinator 100 may be detected at operation 302. The button may be one of a physical button included in an outside of the coordinator 100, a soft key which is displayed on a display unit of the coordinator 100, and the like. The operations 300 and 302 may be performed at the same time, or in a different order.

The wireless device 120 transmits a pairing request message to the coordinator 100 at operation 304. At this time, the wireless device 120 may the pairing request message to the coordinator 100 using transmit power which is set for a general wireless communication.

Upon receiving the pairing request message, the coordinator 100 transmits a message which requests the terminal 110 to determine whether the wireless device 120 is an authenticated wireless device to the terminal 110 at operation 306. Upon receiving the message which requests the terminal 110 to determine whether the wireless device 120 is the authenticated wireless device, the terminal 110 determines to start authentication for the wireless device 120 at operation 308. Here, the terminal 110 may determine to start the authentication for the wireless device 120 as soon as the terminal 110 receives the message which requests the terminal 110 to determine whether the wireless device 120 is the authenticated wireless device, or determine to start the authentication for the wireless device 120 according to an additional event, such as detection of a key signal, and the like.

The terminal 110 approaches adjacent location which is within a preset distance from the wireless device 120 for authentication for the wireless device 120 at operation 310. In FIG. 3, the preset distance is 1 meter, however, it will be understood by those of ordinary skill in the art that the preset distance may be changed.

The wireless device 120 adjusts transmit power of the wireless device 120 thereby the wireless device 120 has power which is lower than preset power at operation 312.

The wireless device 120 transmits a beacon signal including a second encryption key using the adjusted transmit power at operation 314. Unlike a general beacon signal, the beacon signal may be received within the preset distance and is used for transferring the second encryption key. For example, the second encryption key may be a symmetric key which is used in a channel for a communication between the terminal 110 and the wireless device 120, and the like.

Upon receiving the beacon signal, the terminal 110 measures received signal strength, e.g., an RSSI of the beacon signal, and calculates a distance between the terminal 110 and the wireless device 120 at operation 316. For example, the distance between the terminal 110 and the wireless device 120 may be calculated using Equation 1.

Upon detecting that the distance between the terminal 110 and the wireless device 120 is less than 1 meter, the terminal 110 determines that the authentication for the wireless device 120 is successful at operation 318. The terminal 110 transmits an authentication success message indicating that the authentication is successful and the second encryption key to the coordinator 100 at operation 320. Here, the terminal 110 may encrypt the authentication success message and the second encryption key based on a first encryption key which is acquired from a process in which a terminal is registered in a coordinator as described in FIG. 2 to the encrypted authentication success message and second encryption key to the coordinator 100.

The terminal 110 transmits an authentication success message which is encrypted based on the second encryption key to the wireless device 120 at operation 322. At this time, the terminal 110 is adjacent to the wireless device 120, so the terminal 110 transmits the authentication success message to the wireless device 120 using transmit power which is lower than preset transmit power.

Upon receiving the authentication success message, the wireless device 120 changes transmit power of the wireless device 120 to the transmit power before the adjustment at operation 324. The wireless device 120 completes a pairing operation with the coordinator 100 by receiving a second encryption key to be used on an encryption channel with the coordinator 100 at operation 326.

Although FIG. 3 illustrates a process of performing a pairing process between a coordinator and a wireless device through a terminal in a wireless communication system according to an embodiment of the present disclosure, various changes could be made to FIG. 3. For example, although shown as a series of operations, various operations in FIG. 3 could overlap, occur in parallel, occur in a different order, or occur multiple times.

A process of performing a pairing process between a coordinator and a wireless device through a terminal in a wireless communication system according to an embodiment of the present disclosure has been described with reference to FIG. 3, and a process for performing a pairing agent function in a terminal in a wireless communication system according to an embodiment of the present disclosure will described with reference to FIG. 4.

Figure 4:
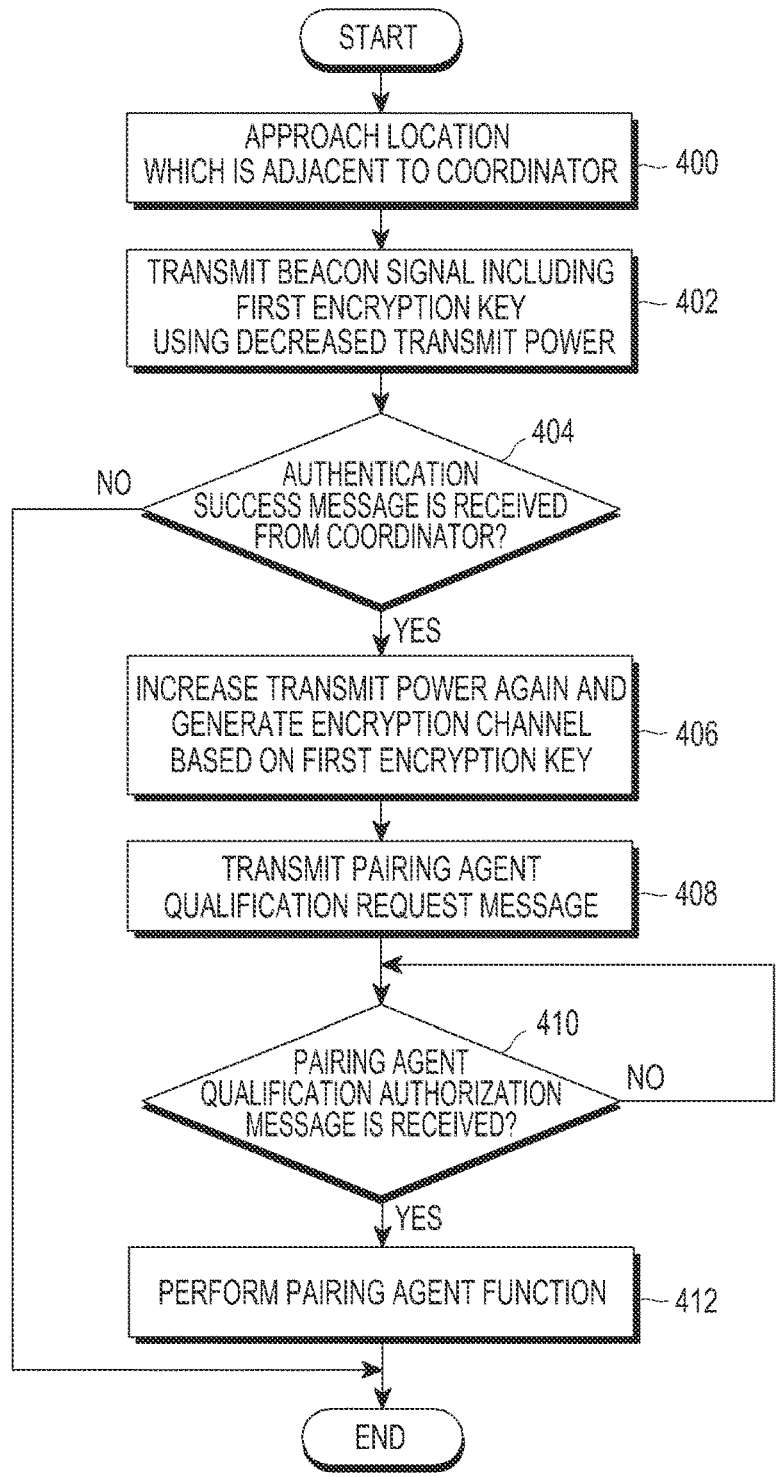
FIG. 4 is a flowchart illustrating a process for performing a pairing agent function in a terminal in a wireless communication system according to an embodiment of the present disclosure.

FIG. 4 is a flowchart illustrating a process for performing a pairing agent function in a terminal in a wireless communication system according to an embodiment of the present disclosure.

Referring to FIG. 4, the terminal 110 detects that the terminal 110 approaches location which is adjacent to a coordinator 100 at operation 400. Here, the location which is adjacent to the coordinator 100 denotes location at which a distance between the terminal 110 and the coordinator 100 is less than a preset distance. The terminal 110 decreases transmit power which is currently set by preset power, and transmits a beacon signal including a first encryption key using the decreased transmit power at operation 402. The beacon signal is used for authentication for the terminal 110 in the coordinator 100.

The terminal 110 determines whether an authentication success message is received from the coordinator 100 at operation 404. If the authentication success message is received from the coordinator 100, the terminal 110 increases the transmit power to previous transmit power, and generates an encryption key with the coordinator 100 based on the first encryption key at operation 406.

The terminal 110 transmits a request message for requesting a qualification for performing a function of a pairing agent to the coordinator 100 through the encryption channel at operation 408. For convenience, the request message for requesting the qualification for performing the function of the pairing agent will be referred to as a pairing agent qualification request message. The terminal 110 determines whether a response message which authorizes the terminal 110 to perform the function of the pairing agent is received from the coordinator 100 at operation 410. For convenience, the response message which authorizes to perform the function of the pairing agent will be referred to as a pairing agent qualification authorization message.

If the pairing agent qualification authorization message is received from the coordinator 100, the terminal 110 performs the function of the pairing agent at operation 412. A process of performing the function of the pairing agent in the terminal 110 will be described below, so a detailed description will be omitted herein.

Although FIG. 4 illustrates a process for performing a pairing agent function in a terminal in a wireless communication system according to an embodiment of the present disclosure, various changes could be made to FIG. 4. For example, although shown as a series of operations, various operations in FIG. 4 could overlap, occur in parallel, occur in a different order, or occur multiple times.

A process for performing a pairing agent function in a terminal in a wireless communication system according to an embodiment of the present disclosure has been described with reference to FIG. 4, and a process in which a coordinator authorizes a pairing agent function to a terminal in a wireless communication system according to an embodiment of the present disclosure will described with reference to FIG. 5.

Figure 5:
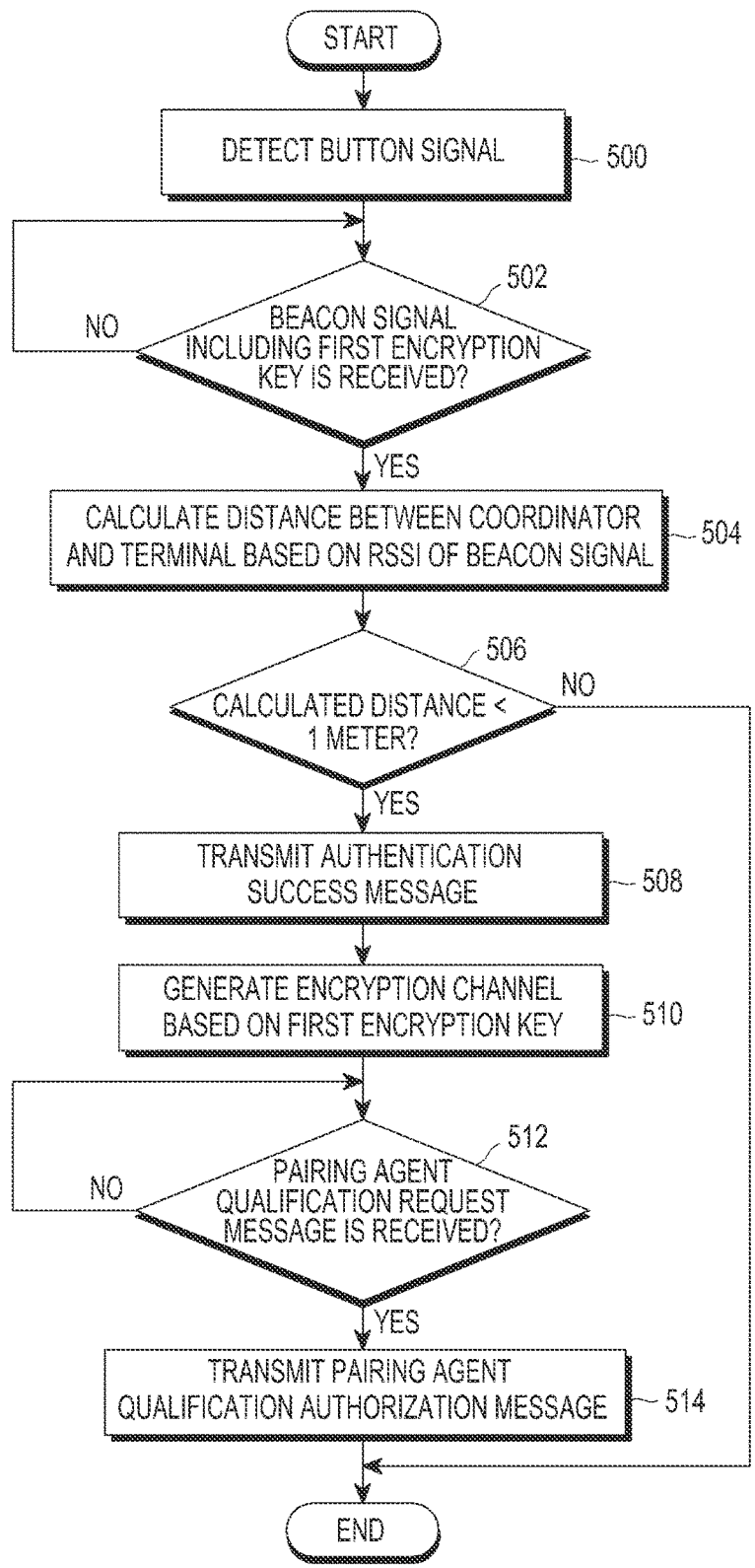
FIG. 5 is a flowchart illustrating a process in which a coordinator authorizes a pairing agent function to a terminal in a wireless communication system according to an embodiment of the present disclosure.

FIG. 5 is a flowchart illustrating a process in which a coordinator authorizes a pairing agent function to a terminal in a wireless communication system according to an embodiment of the present disclosure.

Referring to FIG. 5, the coordinator 100 detects a button signal which corresponds to a preset button for starting a pairing process at operation 500. The coordinator 100 determines whether a beacon signal including a first encryption key is received from a terminal 110 at operation 502.

If the beacon signal is received from the terminal 110, the coordinator 100 calculates a distance between the coordinator 100 and the terminal 110 based on received signal strength, e.g., an RSSI of the beacon signal at operation 504. The coordinator 100 determines whether the calculated distance is shorter than a preset distance, e.g., 1 meter at operation 506. If the calculated distance is shorter than 1 meter, the coordinator 100 transmits an authentication success message indicating that authentication for the terminal 110 is successful to the terminal 110 at operation 508.

The coordinator 100 generates an encryption channel with the terminal 110 based on the first encryption key at operation 510. The coordinator 100 determines whether a pairing qualification request message is received from the terminal 110 through the encryption channel at operation 512. If the pairing qualification request message is received from the terminal 110, the coordinator 100 transmits pairing qualification message to the terminal 110 at operation 514.

Although FIG. 5 illustrates a process in which a coordinator authorizes a pairing agent function to a terminal in a wireless communication system according to an embodiment of the present disclosure, various changes could be made to FIG. 5. For example, although shown as a series of operations, various operations in FIG. 5 could overlap, occur in parallel, occur in a different order, or occur multiple times.

A process in which a coordinator authorizes a pairing agent function to a terminal in a wireless communication system according to an embodiment of the present disclosure has been described with reference to FIG. 5, and a process for performing a paring process with a wireless device in a coordinator in a wireless communication system according to an embodiment of the present disclosure will described with reference to FIG. 6.

Figure 6:
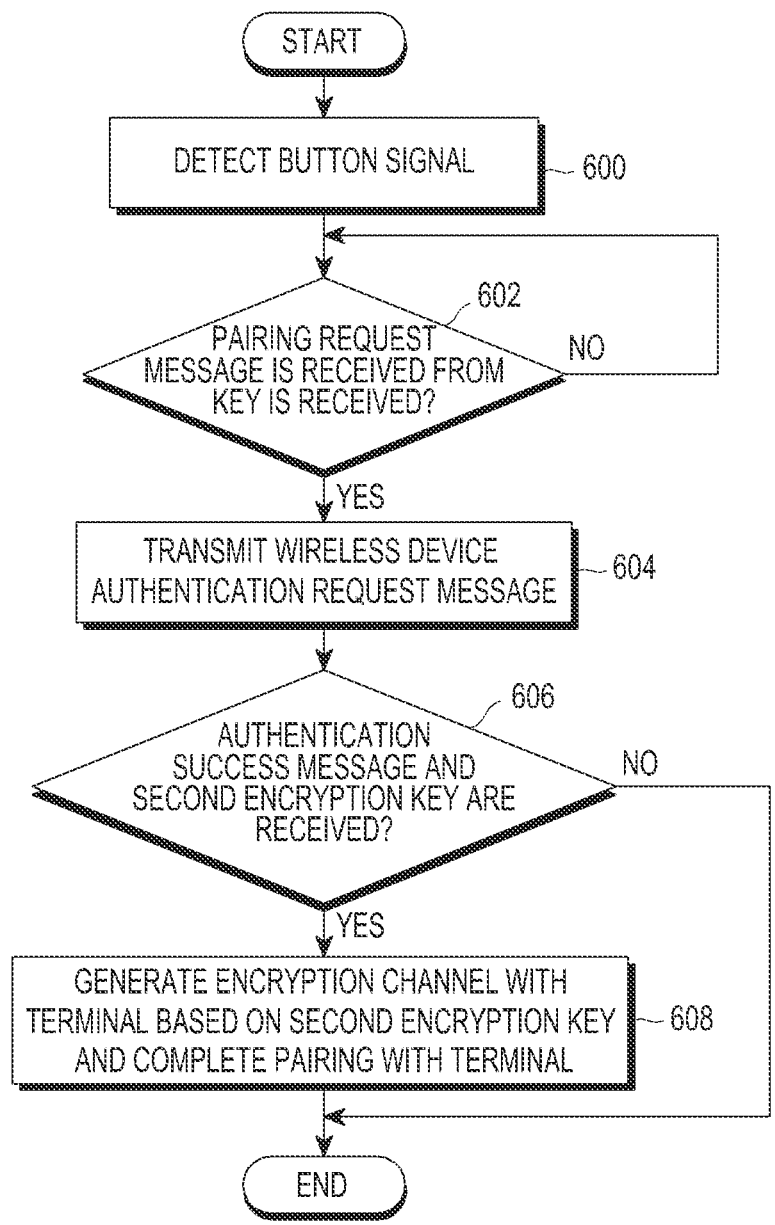
FIG. 6 is a flowchart illustrating a process for performing a paring process with a wireless device in a coordinator in a wireless communication system according to an embodiment of the present disclosure.

FIG. 6 is a flowchart illustrating a process for performing a paring process with a wireless device in a coordinator in a wireless communication system according to an embodiment of the present disclosure.

Referring to FIG. 6, the coordinator 100 detects a button signal which corresponds to a preset button for starting a pairing process at operation 600. The coordinator 100 determines whether a pairing request message is received from a wireless device 120 at operation 602. If the pairing request message is received from the wireless device 120, the coordinator 100 transmits a wireless device authentication request message for requesting authentication for the wireless device 120 to the terminal 110 at operation 604.

The coordinator 100 determines whether an authentication success message indicating that the authentication for the wireless device 120 is successful and a second encryption key are received from the terminal 110 at operation 606. If the authentication success message indicating that the authentication for the wireless device 120 is successful and the second encryption key are received from the terminal 110, the coordinator 100 generates an encryption channel with the terminal 110 and completes pairing with the terminal 110 at operation 608.

Although FIG. 6 illustrates a process for performing a paring process with a wireless device in a coordinator in a wireless communication system according to an embodiment of the present disclosure, various changes could be made to FIG. 6. For example, although shown as a series of operations, various operations in FIG. 6 could overlap, occur in parallel, occur in a different order, or occur multiple times.

A process for performing a paring process with a wireless device in a coordinator in a wireless communication system according to an embodiment of the present disclosure has been described with reference to FIG. 6, and a process for performing a paring agent function in a terminal in a wireless communication system according to an embodiment of the present disclosure will described with reference to FIG. 7.

Figure 7:
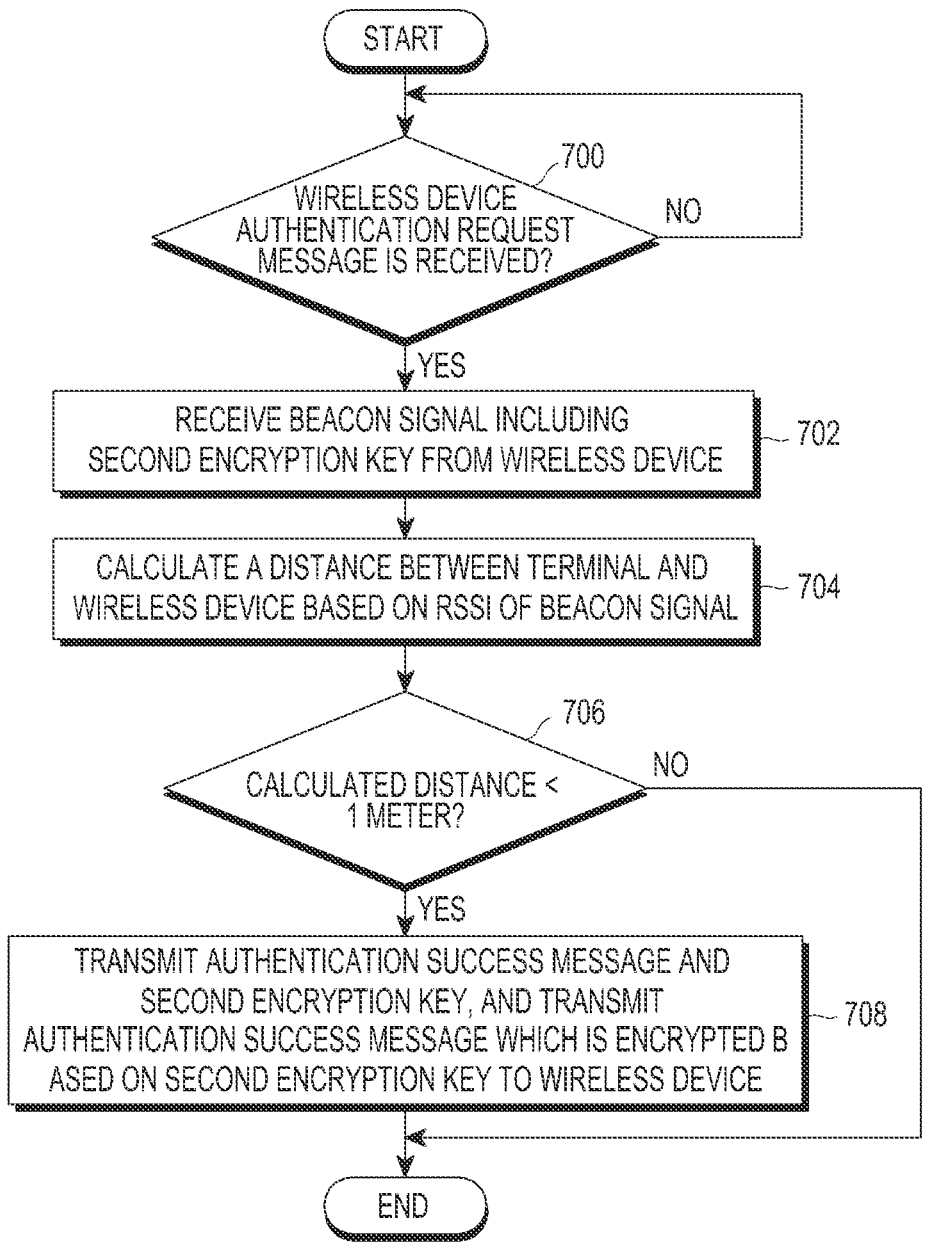
FIG. 7 is a flowchart illustrating a process for performing a paring agent function in a terminal in a wireless communication system according to an embodiment of the present disclosure.

FIG. 7 is a flowchart illustrating a process for performing a paring agent function in a terminal in a wireless communication system according to an embodiment of the present disclosure.

Referring to FIG. 7, the terminal 110 determines whether a wireless device authentication request message is received from the coordinator 100 at operation 700. If the wireless device authentication request message is received from the coordinator 100, the terminal 110 approaches the wireless device 120, and receives a beacon signal including a second encryption key from the wireless device 120 at operation 702.

The terminal 110 calculates a distance between the terminal 110 and the wireless device 120 based on received signal strength, e.g., an RSSI of the beacon signal at operation 704. The terminal 110 determines whether the calculated distance between the terminal 110 and the wireless device 120 is shorter than a preset distance, e.g., 1 meter at operation 706. If the distance between the terminal 110 and the wireless device 120 is shorter than the preset distance, the terminal 110 transmits an authentication success message indicating that authentication for the wireless device 120 is successful and the second encryption key to the coordinator 100, and transmits an authentication success message which is encrypted based on the second encryption key to the wireless device 120 at operation 708.

Although FIG. 7 illustrates a process for performing a paring agent function in a terminal in a wireless communication system according to an embodiment of the present disclosure, various changes could be made to FIG. 7. For example, although shown as a series of operations, various operations in FIG. 7 could overlap, occur in parallel, occur in a different order, or occur multiple times.

A process for performing a paring agent function in a terminal in a wireless communication system according to an embodiment of the present disclosure has been described with reference to FIG. 7, and a process for performing paring for a coordinator through a terminal in a wireless device in a wireless communication system according to an embodiment of the present disclosure will described with reference to FIG. 8.

Figure 8:
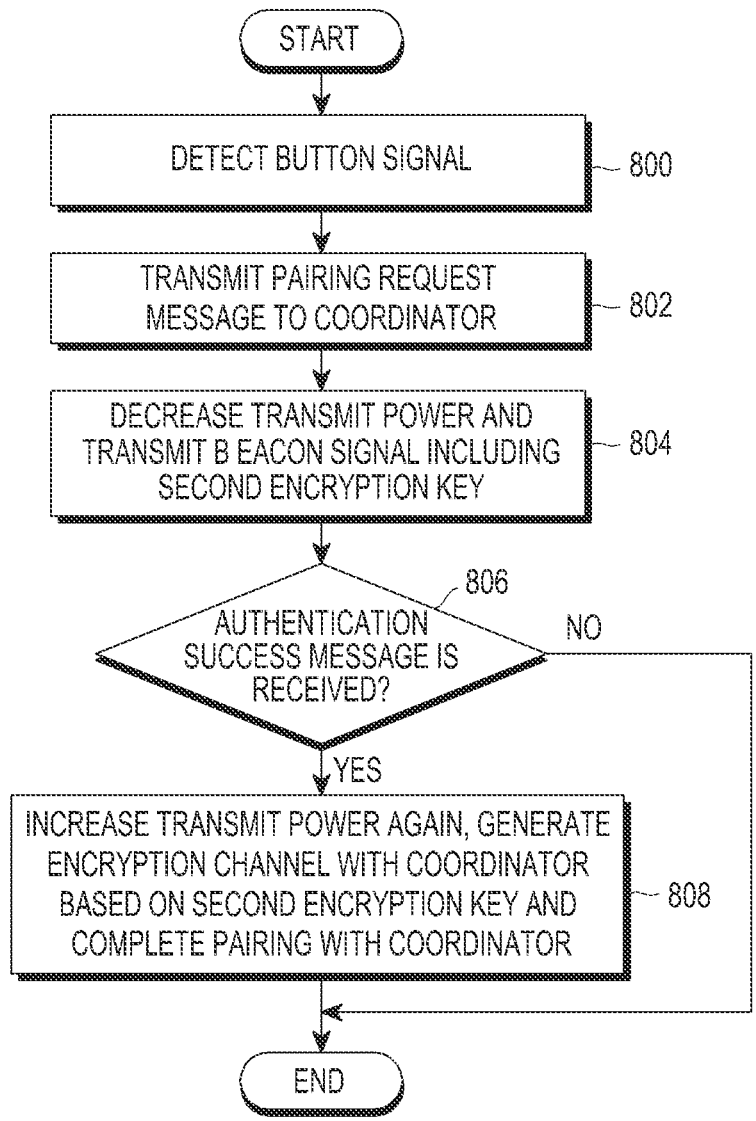
FIG. 8 is a flowchart illustrating a process for performing paring for a coordinator through a terminal in a wireless device in a wireless communication system according to an embodiment of the present disclosure.

FIG. 8 is a flowchart illustrating a process for performing paring for a coordinator through a terminal in a wireless device in a wireless communication system according to an embodiment of the present disclosure.

Referring to FIG. 8, the wireless device 120 detects a button signal which corresponds to a preset button for starting a pairing process at operation 800. The wireless device 120 transmits a pairing request message to the coordinator 100 at operation 802. The wireless device 120 decreases transmit power and transmits a beacon signal including a second encryption key using the decreased transmit power at operation 804.

The wireless device 120 determines whether an authentication success message which is encrypted based on the second encryption key is received from the terminal 110 at operation 806. If the authentication success message which is encrypted based on the second encryption key is received from the terminal 110, the wireless device 120 increases the transmit power of the wireless device 120 again, generates an encryption channel with the coordinator 100 based on the second encryption key, and completes the pairing with the coordinator 100 at operation 808.

Although FIG. 8 illustrates a process for performing paring for a coordinator through a terminal in a wireless device in a wireless communication system according to an embodiment of the present disclosure, various changes could be made to FIG. 8. For example, although shown as a series of operations, various operations in FIG. 8 could overlap, occur in parallel, occur in a different order, or occur multiple times.

A process for performing paring for a coordinator through a terminal in a wireless device in a wireless communication system according to an embodiment of the present disclosure has been described with reference to FIG. 8, and an inner structure of each of a coordinator, a terminal, and a wireless device in a wireless communication system according to an embodiment of the present disclosure will described with reference to FIG. 9.

Figure 9:
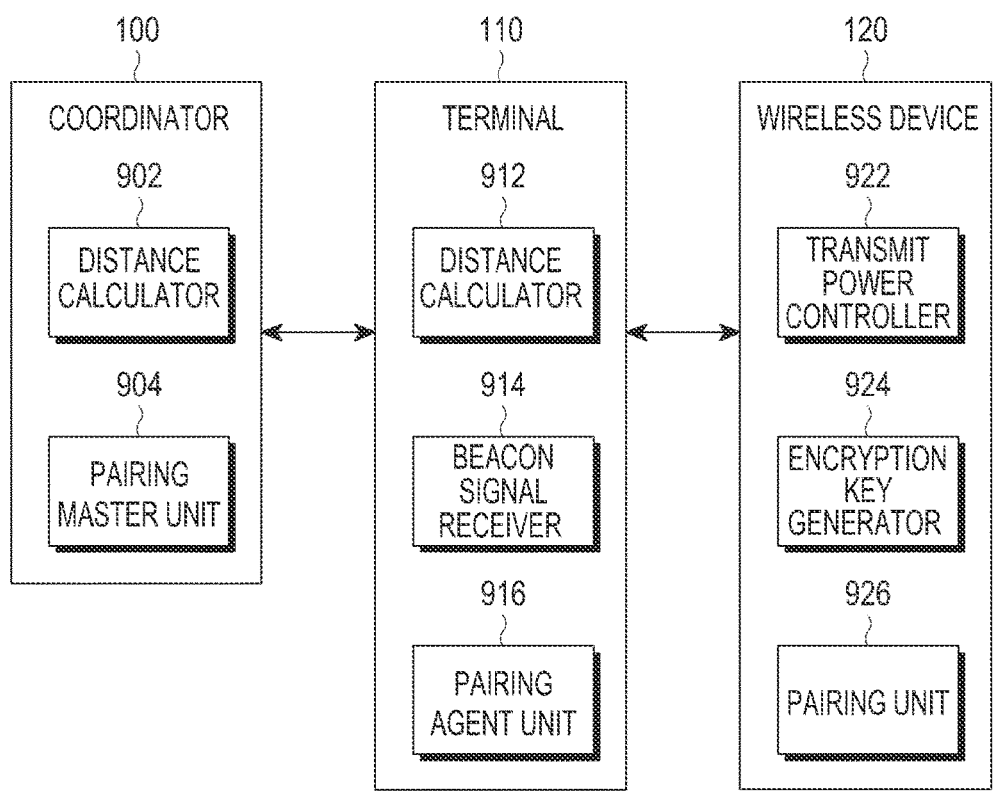
FIG. 9 schematically illustrates an inner structure of each of a coordinator, a terminal, and a wireless device in a wireless communication system according to an embodiment of the present disclosure.

FIG. 9 schematically illustrates an inner structure of each of a coordinator, a terminal, and a wireless device in a wireless communication system according to an embodiment of the present disclosure.

Referring to FIG. 9, the coordinator 100 includes a distance calculator 902 and a pairing master unit 904.

The distance calculator 902 calculates a distance between the coordinator 100 and a terminal 110 based on received signal strength, e.g., an RSSI of a beacon signal which is received from the terminal 110. The pairing master unit 904 performs a pairing operation with the terminal 110 and an operation to authorize a qualification as a pairing agent to the terminal 110 as described in FIG. 2, and performs a pairing operation with the wireless device 120 through the terminal 110 as described in FIG. 3.

As described above, the distance calculator 902 and the pairing master unit 904 may be included in the coordinator 100 as units which are physically divided. However, if a controller for controlling an overall operation of the coordinator 100, e.g., an operation of the coordinator 100 as described in FIGS. 2 and 3 and controlling units included in the coordinator 100 performs a function of the distance calculator 902 and the pairing master unit 904, the distance calculator 902 and the pairing master unit 904 may not be included in the coordinator 100.

Further, the terminal 110 includes a distance calculator 912, a beacon signal receiver 914, and a pairing agent unit 916.

The distance calculator 912 calculates a distance between the terminal 110 and the wireless device 120 based on received signal strength, e.g., an RSSI of a beacon signal which is received from the wireless device 120. The beacon signal receiver 914 receives a beacon signal from the wireless device 120. If there is other unit for performing a wireless communication including reception of a beacon signal within the terminal 110, the beacon signal receiver 914 may not be included in the terminal. The pairing agent unit 916 performs a pairing agent function for the wireless device 120 as described in FIG. 3 if the pairing agent function is authorized to the terminal 110 from the coordinator 100 through a process described in FIG. 2.

The distance calculator 912 and the pairing agent unit 916 may be included in the terminal as units which are physically divided as shown in FIG. 9. However, if a controller which controls an overall operation of the terminal 110, e.g., an operation of the terminal 110 as described in FIGS. 2 and 3, and units included in the terminal 110 performs a function of the distance calculator 912 and the pairing agent unit 916, the distance calculator 912 and the pairing agent unit 916 may not be included in the terminal.

Further, the wireless device 120 includes a transmit power controller 922, an encryption key generator 924, and a pairing unit 926.

The transmit power controller 922 performs an operation of adjusting transmit power of the wireless device 120 as described in FIG. 3. The encryption key generator 924 performs an operation of generating the second encryption key, and the pairing unit 926 performs paring with the coordinator 100 based on a pairing agent operation of the terminal 110.

The transmit power controller 922, the encryption key generator 924, and the pairing unit 926 may be included in the terminal as units which are physically divided as shown in FIG. 9. However, if a controller which controls an overall operation of the wireless device 120, e.g., an operation of the wireless device 120 as described in FIGS. 2 and 3, and units included in the of the wireless device 120 performs a function of transmit power controller 922, the encryption key generator 924, and the pairing unit 926, transmit power controller 922, the encryption key generator 924, and the pairing unit 926 may not be included in the terminal.

While the distance calculator 902 and the pairing master unit 904 are described as separate units, it is to be understood that this is merely for convenience of description. In other words, the coordinator 100 may be implemented with one processor.

While the distance calculator 912, the beacon signal receiver 914, and the pairing agent unit 916 are described as separate units, it is to be understood that this is merely for convenience of description. In other words, two or more of the distance calculator 912, the beacon signal receiver 914, and the pairing agent unit 916 may be incorporated into a single unit. Here, the terminal 110 may be implemented with one processor.

While the transmit power controller 922, the encryption key generator 924, and the pairing unit 926 are described as separate units, it is to be understood that this is merely for convenience of description. In other words, two or more of the transmit power controller 922, the encryption key generator 924, and the pairing unit 926 may be incorporated into a single unit. Here, the wireless device 120 may be implemented with one processor.

Although not shown in FIG. 9, the coordinator 100, the terminal 110, and the wireless device 120 may further include a transmitter and a receiver, or a transceiver which may perform a wireless communication one another, and a memory which stores a first encryption key and/or a second encryption key, various information which is transmitted and received in an authentication and pairing process, and the like.

As is apparent from the foregoing description, an embodiment of the present disclosure enables to perform authentication for a wireless device which does not include a display unit using a terminal including a display unit thereby an authentication process and an encryption key transfer process are exactly performed and various wireless devices are paired with a network.

An embodiment of the present disclosure enables to perform a pairing process thereby power consumption of a wireless device due to the pairing process is decreased and it is possible to use a unified pairing scheme for wireless devices of which connection schemes are different.

An embodiment of the present disclosure enables to perform a pairing process in a wireless communication system.

An embodiment of the present disclosure enables to perform a pairing process thereby performing authentication for a wireless device using a terminal including a display unit.

An embodiment of the present disclosure enables to perform a pairing process for a wireless device which is authenticated through a terminal.

An embodiment of the present disclosure enables to perform a pairing process thereby decreasing power consumption of a wireless device due to the pairing process.

An embodiment of the present disclosure enables to perform a pairing process thereby it is possible to use a unified pairing scheme for wireless devices of which connection schemes are different.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a pairing process in a wireless device in a wireless communication system, the method comprising:
    transmitting, by the wireless device, a pairing request message to a coordinator;
    transmitting, by the wireless device, a signal including an encryption key to a terminal, wherein the terminal is authenticated as a pairing agent by the coordinator in response to the pairing request message;
    receiving, by the wireless device, an authentication success message which is encrypted based on the encryption key from the terminal; and
    performing, by the wireless device, the pairing process with the coordinator based on the encryption key,
    wherein the authentication success message is received if an authentication for the wireless device is successful based on a received signal strength of the signal including the encryption key which is measured at the terminal, and
    wherein the encryption key is transmitted from the terminal to the coordinator if the authentication for the wireless device is successful.

2. The method of claim 1, wherein the transmitting of the signal including the encryption key to the terminal comprises:
    decreasing transmit power of the wireless device by preset power; and
    transmitting the signal including the encryption key to the terminal based on the decreased transmit power.

3. The method of claim 2, wherein the performing of the pairing process with the coordinator based on the encryption key comprises:
    increasing the decreased transmit power by the preset power upon receiving the authentication success message; and
    performing the pairing process with the coordinator based on the increased transmit power.

4. The method of claim 1, wherein the authentication for the wireless device is successful if a distance between the wireless device and the terminal which is calculated based on the received signal strength is shorter than a preset distance.

5. The method of claim 1,
    wherein the terminal comprises a display unit for displaying an authentication process, and
    wherein the terminal is authorized to perform the authentication for the wireless device.

6. The method of claim 1, wherein the transmitting of the signal including the encryption key to the terminal comprises:
    detecting that a key signal which corresponds to a preset key for performing the pairing process with the coordinator is input.

7. A method for performing a pairing process in a coordinator in a wireless communication system, the method comprising:
    receiving, by the coordinator, a signal including a first encryption key from a terminal;
    transmitting, by the coordinator, a first authentication success message to the terminal, if an authentication for the terminal is successful based on a received signal strength of the signal including the first encryption key which is measured at the coordinator;

generating, by the coordinator, an encryption channel with the terminal based on the first encryption key;

pairing, by the coordinator, with the terminal;

transmitting, by the coordinator, a message indicating that the terminal is authorized to perform an authentication for a wireless device from the coordinator for a network access of the wireless device;

receiving, by the coordinator, a pairing request message from the wireless device;

transmitting, by the coordinator, a message which requests the authentication for the wireless device to the terminal upon receiving the pairing request message from the wireless device;

receiving, by the coordinator, a second authentication success message indicating that the authentication for the wireless device is successful and a second encryption key from the terminal; and performing, by the coordinator, the pairing process with the wireless device based on the second encryption key.

8. The method of claim 7, further comprising:

calculating a distance between the terminal and the coordinator based on the received signal strength of the signal including the first encryption key;

wherein the first authentication success message is transmitted, if the calculated distance between the terminal and the coordinator is shorter than a preset distance.

9. The method of claim 7, wherein the transmitting of the first authentication success message to the terminal comprises:

decreasing transmit power of the coordinator by preset power; and transmitting the first authentication success message indicating that the authentication for the terminal is successful to the terminal based on the decreased transmit power.

10. A method for performing authentication for a terminal in a wireless communication system, the method comprising:

transmitting, by the terminal, a signal including a first encryption key to a coordinator;

receiving, by the terminal, a first authentication success message from the coordinator, if an authentication for the terminal is successful based on a received signal strength of the signal including the first encryption key which is measured at the coordinator;

generating, by the terminal, an encryption channel with the terminal based on the first encryption key;

pairing, by the terminal, with the coordinator;

receiving, by the terminal, a message indicating that the terminal is authorized to perform an authentication for a wireless device from the coordinator for a network access of the wireless device;

receiving, by the terminal, a signal including a second encryption key from the terminal upon receiving a message which requests the authentication for the wireless device from the coordinator; and transmitting, by the terminal, the second encryption key and a second authentication success message indicating that the authentication for the wireless device is successful to the coordinator and the terminal if the authentication for the wireless device is successful based on a received signal strength of the signal including the second encryption key.

11. The method of claim 10, wherein the authentication for the wireless device is successful if a distance between the wireless device and the terminal which is calculated based on the received signal strength is shorter than a preset distance.

12. The method of claim 10, wherein the authentication for the terminal is successful if a distance between the terminal and the coordinator which is calculated based on the received signal strength of the signal including the second first encryption key is shorter than a preset distance.

13. The method of claim 12, wherein the transmitting of the signal including the first encryption key to the coordinator comprises:

decreasing transmit power of the terminal by preset power; and transmitting the signal including the first encryption key to the coordinator based on the decreased transmit power.

14. The method of claim 13, further comprising:

increasing the decreased transmit power by the preset power upon receiving the first authentication success message indicating that the authentication for the terminal is successful.

15. A wireless device in a wireless communication system, the wireless device comprising:

a transceiver configured to:

transmit a pairing request message to a coordinator, transmit a signal including an encryption key to a terminal, wherein the terminal is authenticated as a pairing agent by the coordinator in response to the pairing request message, and receive an authentication success message which is encrypted based on the encryption key from the terminal; and a processor configured to perform a pairing process with the coordinator based on the encryption key, wherein the authentication success message is received if an authentication for the wireless device is successful based on a received signal strength of the signal including the encryption key which is measured at the terminal, and wherein the encryption key is transmitted from the terminal to the coordinator if the authentication for the wireless device is successful.

16. The wireless device of claim 15, wherein the processor is further configured to:

decrease transmit power of the wireless device by preset power, and control the transmitter to transmit the signal including the encryption key to the terminal based on the decreased transmit power.

17. The wireless device of claim 16, wherein the processor is further configured to:

increase the decreased transmit power by the preset power if the authentication success message is received, and perform the pairing process with the coordinator based on the increased transmit power.

18. The wireless device of claim 15, wherein the authentication for the wireless device is successful if a distance between the wireless device and the terminal which is calculated based on the received signal strength is shorter than a preset distance.

19. The wireless device of claim 15, wherein the terminal comprises a display unit for displaying an authentication process, and wherein the terminal is authorized to perform the authentication for the wireless device.

20. The wireless device of claim 15,
wherein the processor is further configured to control the transmitter to transmit the pairing request message to the coordinator, and
wherein the transceiver is further configured to transmit the signal including the encryption key to the terminal upon detecting that a key signal which corresponds to a preset key for performing the pairing process with the coordinator is input.

21. A coordinator in a wireless communication system, the coordinator comprising:
a transceiver configured to:
receive a signal including a first encryption key from a terminal, and
transmit a first authentication success message to the terminal if an authentication for the terminal is successful based on a received signal strength of the signal including the first encryption key which is measured at the coordinator; and
a processor configured to:
generate an encryption channel with the terminal based on the first encryption key, and
pair with the terminal,
wherein the transceiver is further configured to:
transmit a message indicating that the terminal is authorized to perform an authentication for a wireless device from the coordinator for a network access of the wireless device,
receive a pairing request message from the wireless device, and
transmit a message which requests the authentication for the wireless device to the terminal upon receiving the pairing request message from the wireless device, and
wherein the processor is further configured to perform a pairing process with the wireless device based on a second encryption key.

22. The coordinator of claim 21,
wherein the processor is further configured to calculate a distance between the terminal and the coordinator based on a received signal strength of a signal including the second encryption key, and
wherein the first authentication success message is transmitted if the calculated distance between the terminal and the coordinator is shorter than a preset distance.

23. The coordinator of claim 22, wherein the processor is further configured to:
decrease transmit power of the coordinator by preset power, and
control the transceiver to transmit the first authentication success message indicating that the authentication for the terminal is successful to the terminal based on the decreased transmit power.

24. A terminal in a wireless communication system, the terminal comprising:
a transceiver configured to:
transmit a signal including a first encryption key to a coordinator, and
receive a first authentication success message from the coordinator, if an authentication for the terminal is successful based on a received signal strength of the signal including the first encryption key which is measured at the coordinator; and
a processor configured to:
generate an encryption channel with the terminal based on the first encryption key, and
pair with the coordinator,
wherein the transceiver is further configured to:
receive a message indicating that the terminal is authorized to perform an authentication for a wireless device from the coordinator for a network access of the wireless device,
receive a signal including a second encryption key from the terminal upon receiving a message which requests the authentication for the wireless device from the coordinator, and
transmit the second encryption key and a second authentication success message indicating that the authentication for the wireless device is successful to the coordinator and the terminal if the authentication for the wireless device is successful based on a received signal strength of the signal including the second encryption key.

25. The terminal of claim 24, wherein the authentication for the wireless device is successful if a distance between the wireless device and the terminal which is calculated based on the received signal strength is shorter than a preset distance.

26. The terminal of claim 24, wherein the authentication for the terminal is successful if a distance between the terminal and the coordinator which is calculated based on the received signal strength of the signal including the first encryption key is shorter than a preset distance.

27. The terminal of claim 26, wherein the processor is further configured to:
decrease transmit power of the terminal by preset power, and
control the transmitter to transmit the signal including the first encryption key to the coordinator based on the decreased transmit power.

28. The terminal of claim 27, wherein the processor is further configured to increase the decreased transmit power by the preset power if the first authentication success message indicating that the authentication for the terminal is successful is received.

29. The terminal of claim 24, further comprising:
a display unit configured to display an authentication process for the terminal.

30. At least one non-transitory computer readable storage medium for storing a computer program of instructions configured to be readable by at least one processor for instructing the at least one processor to execute a computer process for performing the method of claim 1.

* * * * *